(12) United States Patent
Yoo

(10) Patent No.: US 6,185,005 B1
(45) Date of Patent: Feb. 6, 2001

(54) HALF TONE IMAGE ENHANCEMENT FOR PRINTERS

(75) Inventor: Jae Hwal Yoo, West Hills, CA (US)

(73) Assignee: Hitachi Koki Imaging Solutions, Inc., Simi Valley, CA (US)

(*) Notice: Under 35 U.S.C. 154(b), the term of this patent shall be extended for 0 days.

(21) Appl. No.: 09/070,280

(22) Filed: Apr. 30, 1998

(51) Int. Cl.[7] .............................. H04N 1/52; H04N 1/60; H04N 1/405; H04N 1/407

(52) U.S. Cl. .......................... 358/1.9; 358/519; 358/534; 358/456

(58) Field of Search ..................................... 382/169, 170, 382/171, 194, 252, 274; 358/456, 457, 458, 459, 465, 466, 534, 535, 536

(56) References Cited

U.S. PATENT DOCUMENTS

| | | |
|---|---|---|
| 4,149,194 | 4/1979 | Holladay . |
| 4,969,052 | 11/1990 | Ishida et al. . |
| 5,014,333 | 5/1991 | Miller et al. . |
| 5,045,952 | 9/1991 | Eschbach . |
| 5,130,823 | 7/1992 | Bowers . |
| 5,196,942 | 3/1993 | Shiau . |
| 5,226,096 | 7/1993 | Fan . |
| 5,243,443 | 9/1993 | Eschbach . |
| 5,268,774 | 12/1993 | Eschbach . |
| 5,287,195 | 2/1994 | Blumer . |
| 5,291,296 | 3/1994 | Hains . |
| 5,305,118 | 4/1994 | Schiller et al. . |
| 5,317,653 | 5/1994 | Eschbach et al. . |
| 5,321,525 | 6/1994 | Hains . |
| 5,325,211 | 6/1994 | Eschbach . |
| 5,587,811 | * 12/1996 | Liguori ................................ 358/456 |

FOREIGN PATENT DOCUMENTS

| | | |
|---|---|---|
| 0293214 | 11/1988 | (EP) . |
| 0621723 | 10/1994 | (EP) . |

OTHER PUBLICATIONS

Roetling, Paul G., *Halftone Method with Edge Enhancement and Moire Suppression*, J.Opt.SocAm., vol. 66, No. 10, Oct., 1976.

Billotet–Hoffmann, C. and Bryngdahl, O., *On the Error Diffusion Technique for Electronic Halftoning*, Physics Department, University of Essen, Federal Republic of Germany.

Floyd, Robert W. And Steinberg, Louis, *An Adaptive Algorithm for Spatial Greyscale*.

Jarvis, J.F., Judice, C.N., and Ninke, W.H., *A Survey of Techniques for the Display of Continuous Tone Pictures of Bilevel Displays*, Computer Graphics and Image Processing, 5, 13–40 (1976).

Ulilchney, R., *Digital Halftoning*, Chapters 1, 2 and 6.

"Tone Reproduction and Screen Design for Pictorial Electrographic Printing", P.G. Roetling, et al., *Journal of Applied Photographic Engineering*, vol. 5, No. 4, pp. 179–182 (Oct., 1979).

"Design of Multilevel Threshold Matrices for Ordered Dither Digital Halftoning, Optimized for Edge Sharpness, Detail Reproduction and Texture", J. Wild, *IEEE*, pp. 2–43—2–45 (May, 1989).

(List continued on next page.)

*Primary Examiner*—Scott Rogers
(74) *Attorney, Agent, or Firm*—Pillsbury Madison & Sutro LLP

(57) ABSTRACT

A method and apparatus for halftoning over a region of output pixels by defining large, or macro, halftone cells corresponding to regions of contiguous pixels and partitioning the macro halftone cells into smaller halftone cells. The gray, or hue, level within a macro halftone cell is determined by the number of pixels which are darkened within the macro halftone cell. Selection of the number of pixels to be darkened in response to input data can be effected in a manner to achieve automatic gamma correction.

20 Claims, 5 Drawing Sheets

OTHER PUBLICATIONS

"A New Bi–Level Quantizing Method for Document Images", Naoki Kuwata, et al., *IEEE*, vol. 38, No. 3, pp. 718–724 (Aug., 1992).

Journal of Applied Photographic Engineering, vol. 5, No. 4, Fall 1979, XP 002040963, "Tone Reproduction and Screen Design for Pictorial Electrographic Printing", Paul G. Roetling and Thomas M. Holladay, pp. 179–182.

"Design of Multilevel Threshold Matrices for Ordered Dither Digital Halftoning, Optimized for Edge Sharpness Detail Reproduction and Texture", Jorg Wild, Technische Universitat Munchen Munich, Federal Republic of Germany, CH2704–5/89/0000/2043, pp. 2–43–2–45.

IEEE Transactions on Consumer Electronics, vol. 38, No. 3, Aug. 1992, "A New Bi–Level Quantizing Method for Document Images", Naoki Kuwata, Yasuhiko Murayama and Soichi Ilno, R&R Div., Seiko Epson Corporation, Suwa–shi Mnagano–ken, Japan, pp. 718–724.

\* cited by examiner

|    | 1   | 2  | 3   | 4   | 5   | 6  | 7   | 8   | 9   | 10 | 11  | 12  | 13  | 14  | 15  | 16  | 17  | 18 | 19  | 20  | 21  | 22 | 23  | 24  | 25  | 26 | 27  | 28  | 29  | 30 | 31  | 32  |
|----|-----|----|-----|-----|-----|----|-----|-----|-----|----|-----|-----|-----|-----|-----|-----|-----|----|-----|-----|-----|----|-----|-----|-----|----|-----|-----|-----|----|-----|-----|
| 1  | 206 | 88 | 2   | 6   | 0   | 76 | 175 | 232 | 203 | 85 | 1   | 6   | 0   | 78  | 179 | 236 | 207 | 88 | 2   | 6   | 0   | 77 | 176 | 233 | 204 | 86 | 1   | 6   | 0   | 79 | 180 | 237 |
| 2  | 129 | 40 | 20  | 57  | 12  | 27 | 105 | 150 | 126 | 39 | 20  | 56  | 12  | 29  | 107 | 153 | 130 | 41 | 21  | 57  | 13  | 28 | 105 | 151 | 127 | 39 | 20  | 56  | 12  | 29 | 108 | 154 |
| 3  | 19  | 43 | 133 | 158 | 111 | 31 | 10  | 52  | 18  | 42 | 132 | 156 | 110 | 30  | 11  | 54  | 19  | 43 | 134 | 158 | 112 | 31 | 10  | 53  | 18  | 42 | 133 | 157 | 111 | 30 | 11  | 55  |
| 4  | 2   | 91 | 212 | 242 | 184 | 65 | 0   | 5   | 2   | 90 | 210 | 240 | 182 | 64  | 0   | 5   | 2   | 92 | 213 | 243 | 185 | 65 | 0   | 5   | 2   | 91 | 211 | 241 | 183 | 64 | 0   | 5   |
| 5  | 0   | 73 | 170 | 227 | 198 | 82 | 1   | 8   | 0   | 72 | 169 | 225 | 196 | 81  | 1   | 8   | 0   | 74 | 171 | 228 | 198 | 82 | 1   | 8   | 0   | 72 | 170 | 226 | 197 | 81 | 1   | 8   |
| 6  | 14  | 25 | 101 | 145 | 122 | 36 | 24  | 63  | 15  | 25 | 100 | 144 | 121 | 36  | 23  | 61  | 14  | 26 | 102 | 146 | 123 | 37 | 24  | 63  | 15  | 25 | 100 | 145 | 121 | 36 | 23  | 61  |
| 7  | 117 | 33 | 9   | 50  | 16  | 48 | 142 | 167 | 119 | 35 | 9   | 49  | 16  | 46  | 139 | 164 | 117 | 34 | 9   | 50  | 16  | 48 | 143 | 168 | 120 | 35 | 9   | 49  | 16  | 47 | 140 | 165 |
| 8  | 191 | 69 | 0   | 4   | 3   | 98 | 223 | 254 | 194 | 71 | 0   | 4   | 3   | 96  | 219 | 250 | 191 | 69 | 0   | 4   | 4   | 99 | 224 | 255 | 195 | 71 | 0   | 4   | 3   | 97 | 220 | 251 |
| 9  | 205 | 86 | 1   | 7   | 1   | 80 | 180 | 238 | 208 | 89 | 2   | 7   | 0   | 77  | 177 | 234 | 206 | 87 | 1   | 7   | 1   | 80 | 181 | 239 | 209 | 89 | 2   | 7   | 0   | 78 | 178 | 235 |
| 10 | 128 | 40 | 21  | 58  | 13  | 29 | 109 | 154 | 131 | 41 | 22  | 59  | 13  | 28  | 106 | 151 | 128 | 40 | 21  | 58  | 13  | 30 | 109 | 155 | 131 | 42 | 22  | 59  | 13  | 28 | 107 | 152 |
| 11 | 18  | 44 | 135 | 159 | 113 | 31 | 11  | 55  | 19  | 44 | 136 | 161 | 114 | 32  | 11  | 53  | 19  | 44 | 136 | 160 | 113 | 32 | 12  | 55  | 20  | 45 | 137 | 162 | 115 | 32 | 11  | 54  |
| 12 | 2   | 92 | 214 | 244 | 185 | 66 | 0   | 6   | 2   | 94 | 216 | 246 | 187 | 67  | 0   | 5   | 2   | 93 | 215 | 245 | 186 | 66 | 0   | 6   | 3   | 94 | 216 | 247 | 188 | 67 | 0   | 5   |
| 13 | 0   | 74 | 172 | 229 | 199 | 83 | 1   | 7   | 0   | 75 | 174 | 231 | 201 | 84  | 1   | 8   | 0   | 75 | 173 | 230 | 200 | 84 | 1   | 7   | 0   | 76 | 175 | 247 | 202 | 85 | 1   | 8   |
| 14 | 15  | 26 | 102 | 147 | 124 | 37 | 22  | 60  | 14  | 27 | 104 | 148 | 125 | 38  | 23  | 62  | 15  | 26 | 103 | 148 | 124 | 38 | 23  | 60  | 14  | 27 | 104 | 149 | 126 | 38 | 24  | 62  |
| 15 | 118 | 34 | 9   | 50  | 17  | 45 | 138 | 162 | 115 | 33 | 10  | 51  | 17  | 47  | 141 | 166 | 119 | 35 | 10  | 51  | 17  | 46 | 139 | 163 | 116 | 33 | 10  | 52  | 17  | 47 | 142 | 166 |
| 16 | 192 | 70 | 0   | 4   | 3   | 95 | 217 | 248 | 189 | 68 | 1   | 4   | 6   | 97  | 221 | 252 | 193 | 70 | 0   | 4   | 3   | 95 | 218 | 249 | 190 | 68 | 0   | 5   | 3   | 98 | 222 | 253 |
| 17 | 208 | 88 | 2   | 6   | 0   | 77 | 177 | 234 | 204 | 86 | 1   | 6   | 0   | 79  | 180 | 238 | 207 | 88 | 2   | 6   | 0   | 77 | 176 | 233 | 203 | 86 | 1   | 6   | 0   | 79 | 179 | 237 |
| 18 | 130 | 41 | 21  | 58  | 13  | 28 | 106 | 151 | 127 | 39 | 20  | 57  | 12  | 29  | 108 | 154 | 129 | 41 | 21  | 57  | 12  | 27 | 105 | 150 | 127 | 39 | 20  | 56  | 12  | 29 | 108 | 153 |

FIG.2A

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| 19 | 19 | 43 | 135 | 159 | 112 | 31 | 11 | 53 | 18 | 43 | 133 | 157 | 111 | 30 | 11 | 55 | 19 | 43 | 134 | 158 | 112 | 31 | 10 | 52 | 18 | 42 | 132 | 156 | 110 | 30 | 11 | 54 |
| 20 | 2 | 92 | 213 | 244 | 185 | 65 | 0 | 5 | 2 | 91 | 211 | 242 | 183 | 64 | 0 | 5 | 2 | 91 | 212 | 243 | 184 | 65 | 0 | 5 | 2 | 90 | 211 | 241 | 182 | 64 | 0 | 5 |
| 21 | 0 | 74 | 172 | 228 | 199 | 83 | 1 | 9 | 0 | 73 | 170 | 226 | 197 | 82 | 1 | 8 | 0 | 73 | 171 | 227 | 198 | 82 | 1 | 8 | 0 | 72 | 169 | 225 | 196 | 81 | 1 | 8 |
| 22 | 15 | 26 | 102 | 146 | 123 | 37 | 24 | 63 | 16 | 25 | 101 | 145 | 122 | 36 | 23 | 61 | 14 | 25 | 101 | 146 | 122 | 37 | 24 | 63 | 15 | 25 | 100 | 144 | 121 | 36 | 23 | 61 |
| 23 | 118 | 34 | 9 | 50 | 17 | 48 | 143 | 168 | 120 | 35 | 9 | 49 | 16 | 47 | 140 | 165 | 117 | 34 | 9 | 50 | 16 | 48 | 143 | 168 | 120 | 35 | 9 | 49 | 16 | 46 | 140 | 164 |
| 24 | 192 | 70 | 4 | 0 | 4 | 99 | 224 | 255 | 195 | 72 | 4 | 0 | 3 | 97 | 221 | 251 | 191 | 69 | 0 | 4 | 3 | 99 | 223 | 254 | 195 | 71 | 0 | 4 | 3 | 96 | 220 | 250 |
| 25 | 206 | 87 | 1 | 7 | 1 | 80 | 182 | 240 | 210 | 90 | 2 | 7 | 0 | 78 | 178 | 236 | 205 | 87 | 1 | 7 | 1 | 80 | 181 | 239 | 209 | 89 | 2 | 7 | 0 | 78 | 177 | 235 |
| 26 | 129 | 40 | 21 | 59 | 13 | 30 | 110 | 156 | 132 | 42 | 22 | 60 | 14 | 28 | 107 | 153 | 128 | 40 | 21 | 58 | 13 | 29 | 109 | 155 | 131 | 41 | 22 | 59 | 13 | 28 | 106 | 152 |
| 27 | 19 | 44 | 136 | 160 | 114 | 32 | 12 | 56 | 20 | 45 | 137 | 162 | 115 | 33 | 11 | 54 | 18 | 44 | 135 | 160 | 113 | 31 | 12 | 55 | 19 | 45 | 137 | 161 | 114 | 32 | 11 | 53 |
| 28 | 2 | 93 | 215 | 245 | 187 | 66 | 0 | 6 | 3 | 94 | 217 | 247 | 188 | 67 | 0 | 5 | 2 | 93 | 214 | 244 | 186 | 66 | 0 | 6 | 3 | 94 | 216 | 246 | 188 | 67 | 0 | 5 |
| 29 | 0 | 75 | 173 | 230 | 201 | 84 | 1 | 7 | 0 | 76 | 175 | 232 | 202 | 85 | 1 | 8 | 0 | 74 | 172 | 229 | 200 | 83 | 1 | 7 | 0 | 75 | 174 | 231 | 202 | 84 | 1 | 8 |
| 30 | 15 | 26 | 103 | 148 | 125 | 38 | 23 | 60 | 14 | 27 | 104 | 149 | 126 | 39 | 24 | 62 | 15 | 26 | 103 | 147 | 124 | 37 | 22 | 60 | 14 | 27 | 104 | 149 | 125 | 38 | 24 | 62 |
| 31 | 119 | 35 | 10 | 51 | 17 | 46 | 139 | 164 | 116 | 33 | 10 | 52 | 18 | 48 | 142 | 167 | 118 | 34 | 9 | 51 | 17 | 45 | 138 | 163 | 116 | 33 | 10 | 52 | 17 | 47 | 141 | 166 |
| 32 | 194 | 71 | 0 | 4 | 3 | 96 | 219 | 249 | 190 | 69 | 0 | 5 | 3 | 98 | 223 | 253 | 193 | 70 | 0 | 4 | 3 | 95 | 218 | 248 | 189 | 68 | 0 | 4 | 3 | 98 | 222 | 252 |

FIG.2B

HALF TONE IMAGE ENHANCEMENT FOR PRINTERS

BACKGROUND OF THE INVENTION

The present invention relates to halftone reproduction of graphic images which are commonly in a bitmap format.

Image information is commonly generated in a bitmap format where the bitmap comprises a plurality of "gray" level cells (or hue concentration level cells for color images). Each cell consists of a two-dimensional array of pixels, or cell elements, and the gray or hue level to be created in each cell is defined by digital values, wherein each digital value represents a gray or hue concentration level among a number of gray or hue concentration levels within the area. Thus, if a cell is composed of 25 pixels, there are 26 levels of gray or hue concentration, varying incrementally between black (or a solid color) and white.

One standard method of converting gray or hue concentration level image data into binary level pixel image data is through the use of dithering or halftoning processes. In such methods, over a given area having a number of gray or hue concentration level cells therein, each pixel of a cell is compared to one of a set of pre-selected thresholds. Each such cell represents a "halftone cell". The effect of such an arrangement is that, for an area where the image is gray or some shade of a hue, some of the thresholds within the halftone cell will be exceeded, while others are not.

In the monochrome case, the pixels or cell elements for which thresholds are exceeded are printed as black or a selected primary color, while the remaining cell elements are allowed to remain white. The human eye integrates the distribution of white and black, or the selected color, over the cell as gray. In this manner, there can be gradual transitions between different shades of gray or the selected color among adjacent halftone cells.

For full or plural color applications, several halftone cells, each corresponding to a different hue, are formed for a given area. The color system superimposes the halftone cells of different hues to form the desired color of the image. Halftoning facilitates varying the concentration or intensity level of hues within the color image by varying the number of darkened pixels for halftone cells corresponding to particular hues. In this manner, the image can have transitions between neighboring colors among adjacent halftone cells. The application of halftoning to color systems is described in detail in the Postscript Reference Manual published by Adobe.

Unfortunately, in using a halftoning technique, there is often a trade-off between maximizing the number of gray or hue concentration levels and the sharpness of the image; the larger each cell is (to contain more pixels), the fewer cells will fit into a given area. Fewer cells within a given area effectively decreases sharpness. This gray or hue concentration level/sharpness trade-off often forces product designers to choose between reproducing an image using many gray levels but in large halftone dots (resulting in coarse, grainy images) or using fine halftone dots but only a few gray or hue concentration levels (which can cause heavy banding). The effects of banding are illustrated described in my U.S. Pat. No. 5,587,81 1, which issued on Dec. 24, 1996, particular reference being made herein to FIG. 1 and the accompanying description in that patent. Banding results from a noticeable jump in the gray levels between adjacent regions.

Some techniques have been developed to address this trade-off between gray levels and sharpness in an attempt to maximize sharpness while minimizing the effects of banding. Xerox Corporation developed a technique called Quad Dot. It is believed that the Quad Dot technique divides a halftone cell into four smaller cells.

The Quad Dot system attempts to distribute darkened pixels among the smaller cells. However, it is believed that the Quad Dot system sequentially adds pixels to adjacent smaller cells in a deterministic circular fashion about the center of the larger cell. This can result in a noticeable pattern within the image.

The above-cited U.S. Pat. No. 5,587,811 addresses certain of the shortcomings of these prior art methods and systems by providing a method and apparatus for halftoning which utilizes a macro halftone cell defining an area of contiguous pixels. The method and apparatus partition the macro halftone cell into a plurality of sub-halftone cells, each sub-halftone cell defining an area of contiguous pixels. A predetermined level of desired grayness or hue intensity determines the quantity of pixels to be darkened within the macro halftone cell. In accordance with one aspect of this method and apparatus, a spot function ranks pixels within the macro halftone cell from highest to lowest such that preferably one or more of the following design rules apply: no two pixels within the same sub-halftone cell are ranked consecutively; and the rank of each individual pixel within each sub-halftone cell is a decreasing function of the distance between the center of the sub-halftone cell and the center of the pixel (e.g., a pixel closest to the center of the sub-halftone cell has the highest rank of pixels within the sub-halftone cell and a pixel furthest from the center of the sub-halftone cell has the lowest rank of pixels within the sub-halftone cell) and the number of pixels ranked above any particular pixel within the sub-halftone cell is no more than one greater and no more than one less than the number of pixels ranked above the particular pixel in any other sub-halftone cell within the macro halftone cell. Each pixel having a rank higher than or equal to a threshold ranking is darkened, wherein the threshold ranking is set so that the determined quantity of pixels is darkened. Such an arrangement has been found to provide an even distribution of darkened pixels among the halftone cells of the macro halftone cell yet maintain a high level of resolution.

In accordance with another aspect of the invention disclosed in U.S. Pat. No. 5,587,811, the macro halftone is partitioned into an area of v by w contiguous sub-halftone cells where v and w are odd positive integers. Having a macro halftone cell of odd dimensions of sub-halftone cells can define exactly one center sub-halftone cell. This facilitates a balanced distribution of sub-halftone spots within the macro halftone cell to provide a balanced image across the macro halftone cell.

By altering the distribution of darkened pixels within the halftone cell for a desired level of grayness, a more balanced image in black and can be produced. Maintaining high resolution and the large number of levels of hue concentration within the macro halftone in color printers provides a smooth transition to neighbor colors and a well balanced in-gamut distribution.

While the method and system disclosed in the above-cited patent do produce image quality improvement, they nevertheless possess certain shortcomings. For example, the transition which they exhibit from one intensity, or darkness, level to the next does not ideal smoothness across a macro halftone cell and they do not permit a gamma correction to be made in an acceptably simple manner. Gamma correction involves a correction for the difference between the percentage of dots in a cell which are darkened and the apparent darkness of that cell. It has been found that over the range of possible darkness values, a cell will generally appear to have a darkness greater than the percentage of dark pixels within the cell. For example, at about the midpoint between the lightest and the darkest levels, when 50% of the pixels in the cell are dark, the average observer will consider the cell to have a darkness of the order of 70%.

BRIEF SUMMARY OF THE INVENTION

An object of the present invention is to provide an improved and system for halftoning that allows automatic gamma correction without requiring additional software.

A further object of the invention is to create a more uniform gray tone or hue across a halftone cell.

The above and other objects are achieved, according to the present invention, in a method for halftoning in an area defined by a matrix of pixels, which method comprises:

partitioning the area into a plurality of macro halftone cells, each macro halftone cell being constituted by an array of contiguous pixels;

determining a quantity of pixels within a macro halftone cell to be darkened based on an input value which is a linear function of a desired level of color intensity for the macro halftone cell;

ranking each of the pixels within each macro halftone cell from a maximum ranking value to a minimum ranking value, each ranking value corresponding to a respective input value; and in each macro halftone cell, darkening each pixel which has a ranking value greater than the associated input value, by the improvement wherein the step of ranking is performed to give each pixel in a macro halftone cell a ranking value which is such that the apparent level of color intensity of each macro halftone cell is linearly proportional to the associated input value.

BRIEF DESCRIPTION OF THE SEVERAL VIEWS OF THE DRAWING

FIG. 2 is a table illustrating the ranks assigned to pixels in a screen representing a macro halftone cell according to one exemplary embodiment of the invention.

DESCRIPTION OF THE APPENDIX

An understanding of one embodiment of the present invention may also be aided by reference to the Appendix A which is a listing of programming instructions in the Matlab script language for the embodiment.

DETAILED DESCRIPTION OF THE INVENTION

Figure 1:
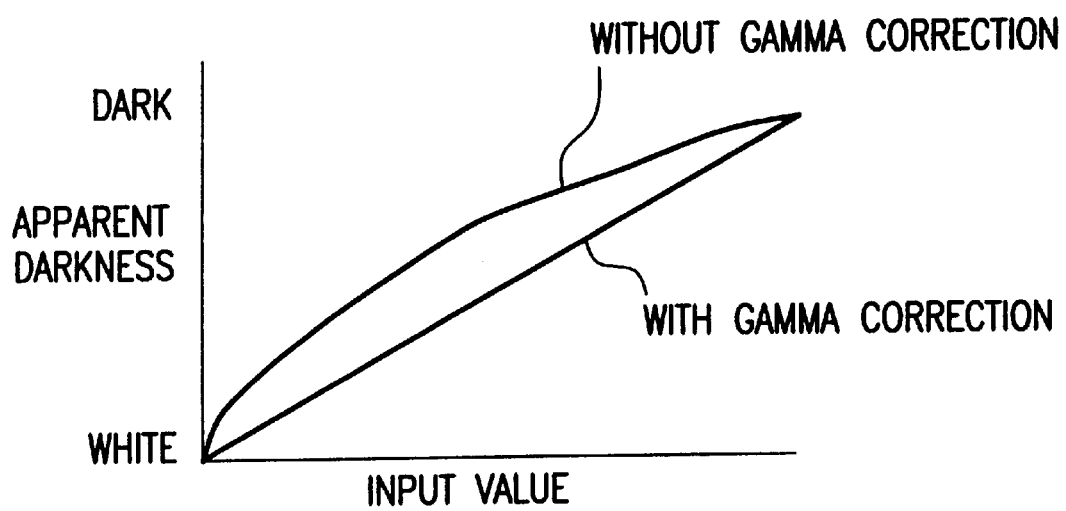
FIG. 1 is a graph illustrating relations between apparent darkness of a halftone cell and an input data value representing desired darkness.

FIG. 1 is a graph which illustrates the reason for, and the result of, gamma correction. This graph shows the relation between an input gray, or hue, level value for one elemental region of an image and the resulting apparent darkness, i.e., the apparent gray level or hue. When the percentage of pixels in a cell which are darkened, i.e., provided with a black or colored spot, is linearly proportional to the input value, the apparent darkness of the cell will vary along the curve entitled WITHOUT GAMMA CORRECTION. This curve represents a non-linear relationship between the apparent darkness and the input value. Thus, to a viewer, the image portion represented by a particular cell will generally appear to be darker than it would appear in an accurately reproduced image.

Therefore, if an appropriate compensating non-linear relation is established between the number, or percentage, of pixels in a cell which are darkened and the input value, a linear relation can be established between the apparent darkness of the cell and the associated input value as represented by the line labeled WITH GAMMA CORRECTION.

It has been found such a linear relation between the apparent darkness of the cell and the associated input value can be established by creating a non-linear relationship between the number of pixels that are darkened and the input value. Taking into account the shape of the curve which is obtained without gamma correction, the non-linear curve (not illustrated) which serves to produce the gamma correction will exhibit an increasing rate of change in the number of darkened pixels as the input value increases from white to dark. Therefore, at the light end of the curve, pixels will be progressively darkened at a low rate in response to incremental changes in the input value, while at the dark end of the curve, pixels will be darkened at a comparatively high rate.

According to the invention, as will become more readily apparent from the following description, such a gamma correction can be built into the ranking of each pixel in a macro halftone cell. The number of pixels having each rank value will increase progressively from the highest rank, representing the pixels which are darkened at the light end of the darkness scale, to the lowest rank, representing pixels which are darkened at the dark end of the darkness scale.

FIG. 2 is a table showing an exemplary group of rankings for all of the pixels of a single screen, representing the ranking scheme for each macro halftone cell, according to one preferred embodiment of the present invention. It should, of course, be understood that FIG. 2 depicts only one exemplary ranking scheme and that many other schemes can be devised pursuant to the inventive principles disclosed herein.

In a manner similar to the technique disclosed in U.S. Pat. No. 5,587,811, each rank value corresponds to an input value threshold. As the input value varies from a value associated with a white screen to the darkest screen, pixels are darkened in descending order of rank. For the first input value which is directly adjacent to the light end of the gray scale, a dark spot will be applied to each pixel having a rank of 255. When the input value corresponding to the dark end of the scale, or the darkest screen, is produced, the last pixels to be provided with a dark spot are those having a rank of "0", at which time all pixels in the macro halftone cell will have been provided with dark spots and that cell will appear to be black or to have the maximum possible hue intensity.

A macro halftone cell according to the invention is characterized in that, for at least some rank values, several pixel locations have the same rank value, and the number of pixel locations having each rank value is selected to provide the desired built-in gamma correction. The distribution of rank values according to the invention can be based on the programming set forth in the Appendix.

According to a further feature of the present invention, pixel rankings are distributed across a macro halftone cell so that the pixel locations having each rank value are distributed as uniformly as possible across the surface of the macro halftone cell, which will cause the macro halftone cell to appear to have a hue which is as uniform as possible across the cell area.

To aid in achieving this objective, the macro halftone cell is considered to be divided into a large number of sub-halftone cells. In the illustrated embodiment, where the macro halftone cell is a 32×32 array, there are provided 32 sub-cells, each containing 32 contiguous pixels. One such sub-cell is outlined in FIG. 2 and is shown to have a diamond form.

Hue uniformity would be optimized if each sub-cell were circular. However, a rectangular array of pixels can not be divided into circular sub-cells which would contain all of the macro cell pixels. Therefore, a sub-cell shape which approximates a circular shape and permits adjacent sub-cells to be fully contiguous is selected. The diamond shape meets these criteria, at least in the case of a 32×32 pixel macro halftone cell.

The identification of each sub-halftone cell as having a diamond shape can be understood to mean that if the macro halftone cell is viewed as lying in a plane, each sub-halftone cell has an outline that conforms generally to a parallelogram whose edges are inclined with respect to the boundary edges of the macro halftone cell.

Preferably, a macro halftone cell contains an integral number of sub-halftone cells, i.e., the number of pixels in the macro halftone cell is an integral number multiple of the number of pixels in a sub-halftone cell. However, improvements according to the invention can be achieved if this relationship is not perfectly attained, i.e., if one or more sub-halftone cells were truncated.

In order to have an integral number of sub-halftone cells in a macro halftone cell, when the macro halftone cell has an even number of rows and columns, each sub-halftone cell cannot be perfectly symmetrical about a single center pixel. Therefore, within each sub-halftone cell, one pixel which is as close to the center as possible is selected and given the highest rank of all pixels within that sub-halftone cell. Then, in all directions from the pixel having the highest rank, the other pixels in the cell have ranks which decrease with increasing distance from the pixel of highest rank.

At least with respect to the pixel of highest rank in each sub-halftone cell, the rank value in each sub-halftone cell will be different from that in each adjacent sub-halftone cell.

All of these sub-halftone cells will be interfitted with one another so that a relatively small spacing exists between the highest ranked pixels of any two adjacent cells. This spacing will determine the screen frequency in that the closer the spacing, the higher the frequency. The screen frequency is equal to the number of dots per inch along each row of an image being reproduced divided by the smallest distance, in pixel units, between the highest ranked pixels in two adjacent sub-halftone cells. Thus, in the embodiment shown in FIG. 2, the smallest distance which determines screen frequency will be, for example, the distance between pixel 8, 8 (row 8, column 8) and pixel 12, 12, or $4\sqrt{2}$ pixel units. If an image is to be reproduced with a pixel density of 600 dots per inch, then the screen frequency, also referred to as lines per inch, would be of the order of 108.

It will be noted that in the illustrated embodiment, each sub-halftone cell extends across seven rows and eight columns. However, the sub-halftone cells could also be configured to each extend over eight rows and seven columns.

The invention is already embodied in printers marketed by Dataproducts Corporation, under model designation DDS24.

Figure 3:
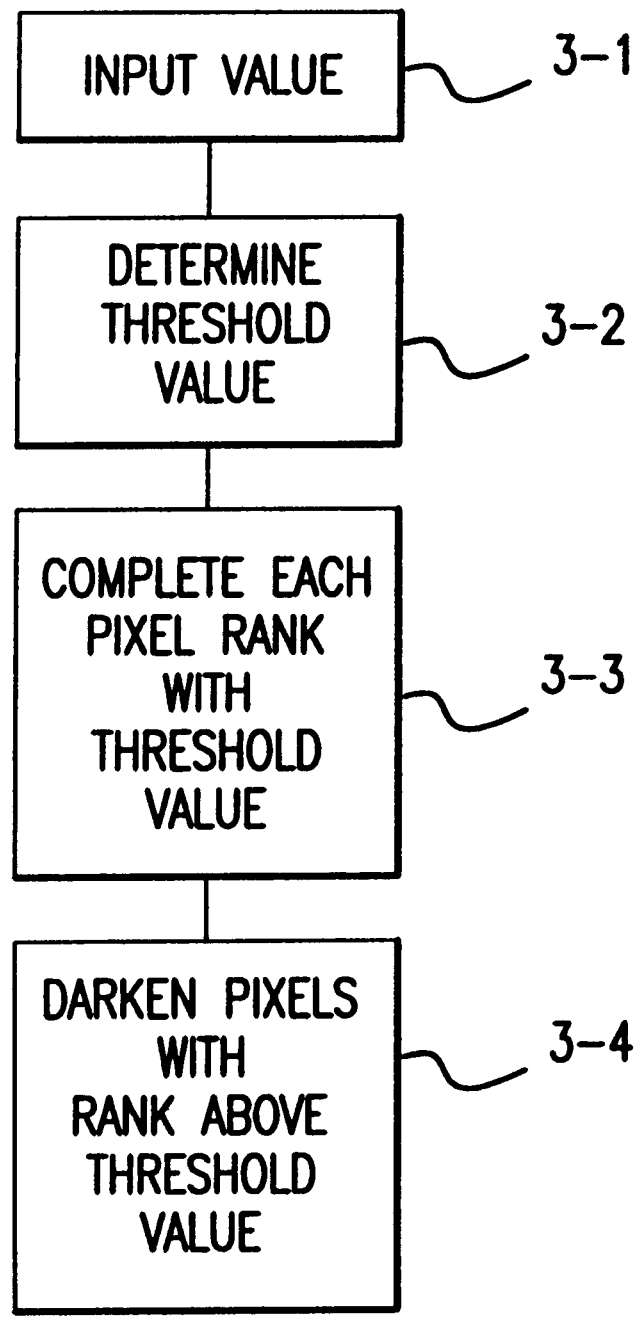
FIG. 3 is a flow diagram illustrating the manner in which halftone screens are generated according to the invention.

FIG. 3. is a flow diagram illustrating the basic steps of converting input values into data which controls, according to the invention, the pixels which are to be darkened in each screen, or macro halftone cell.

In Step 3-1 an input value for a selected macro halftone cell is obtained in a conventional manner from existing image data. This input value is tested, in operation 3-2, to determine a pixel rank threshold value. In accordance with preferred embodiments of the invention, in which gamma correction is built into the ranking of pixels in the macro halftone screen, the threshold value can be linearly proportional to the input value. Then, in operation 3-3, the rank of each pixel in the halftone screen is compared with the given threshold value to identify all pixels having a rank above the threshold value. Finally, in operation 3-4, output data will be generated to darken those pixels having rank values above the threshold value. The resulting pixel generation data produced by operation 3-4 is then utilized in a conventional manner to control the outputting, e.g., printing, operation.

Figure 4:
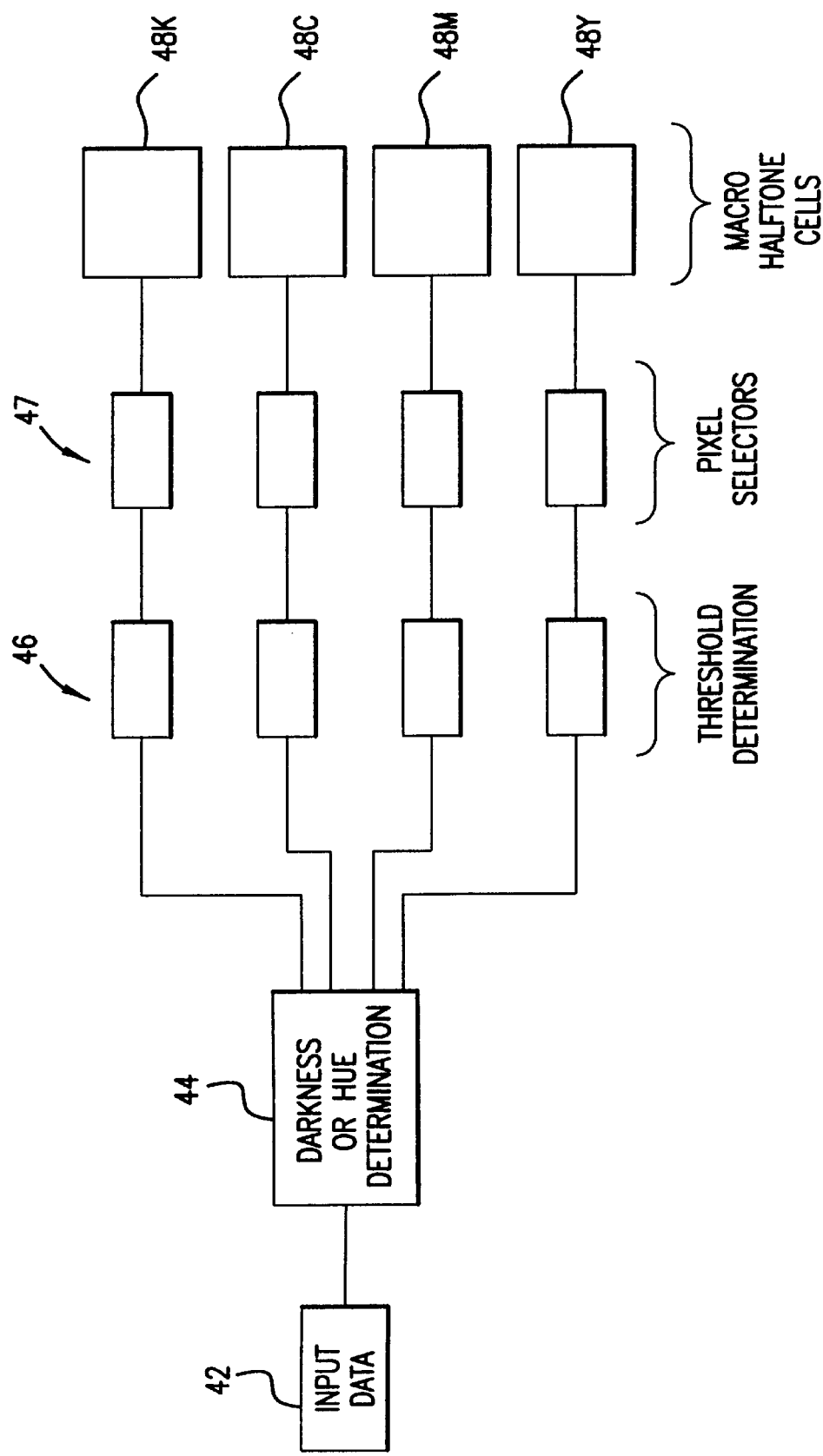
FIG. 4 is a block diagram of a system for effecting halftone printing in accordance with the present invention.

The basic components of a system for implementing the present invention are shown in FIG. 4. For a system in which a full-color image reproduction is to be achieved, four macro halftone cells ((48K) black, (48C) cyan, (48M) magenta, and (48Y) yellow) are superimposed, in accordance with conventional practice, on the medium on which the image is to be reproduced.

Full color input data for controlling image reproduction is supplied by a conventional unit 42 to a processing unit 44 in which the input data is converted, if necessary, into corresponding component darkness or hue values for each of the component image colors, including black. Then, in processing units 46, a threshold value for each basic color is derived from the associated darkness, or hue, value. Here again, in accordance with the present invention, the threshold value for each color can be linearly proportional to the associated darkness or hue value.

The threshold value for each color is supplied to a respective pixel selection unit, which may be constituted by a memory, which stores the rank of each pixel in an associated macro halftone cell, or screen. Each pixel selector 47 outputs a control signal, in a conventional manner, which causes appropriate pixels in the macro halftone cell to be darkened.

In a color system according to the invention, each pixel selector 47 could store a separately derived pixel rank pattern, depending on the gamma correction requirements for each color. Each pixel selector 47 storing the pattern of rank values for a macro halftone cell could be a memory, such as a ROM, a PROM, etc. The rank value for each pixel would be stored at a given memory location. Threshold data representing a respective color at one image point would be inputted to the memory. Such an input signal could have, for example, any one of 256 different values, each value corresponding to a respective gray scale, or hue intensity, level. the location of each pixel having a rank which is above a threshold determined by the value of the threshold signal would then be read out to a suitable control system to identify those pixels which should be provided with a black dot. This information would then be applied to control the application of dots to the medium on which an image is to be reproduced.

In embodiments according to the invention, the same pattern of pixel rank values will be employed for each image point to be reproduced.

The system shown in FIG. 4 could be implemented by suitable programming of existing halftone image reproducing equipment, such as dot matrix printers.

The use of a 32×32 macro halftone cell has the significant advantage of allowing a highly effective gamma correction to be built into the pattern of pixel rank values. However, a more limited gamma correction could be with smaller macro halftone cells, provided that the number of pixels in such smaller cells is sufficiently larger than the number of gray, or hue, levels to be produced.

In view of the relation between the present invention and that disclosed in U.S. Pat. No. 5,587,811, the entirety of that issued patent is incorporated herein by reference.

The preferred embodiments of a color system according to the invention performs halftoning to provide commands to a solid, or hot melt, ink jet printer because the solid ink jet printer can generally produce circular dots with greater clarity. However, the disclosed color halftoning embodiments can be adapted to other systems for reproducing a color image having pixel values for superimposed cells as an input.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for halftoning in an area defined by a matrix of pixels comprising:

partitioning the area into a plurality of macro halftone cells, each macro halftone cell being constituted by an array of contiguous pixels;

defining a plurality of ranking levels, each ranking level being associated with a linear function of a desired level of apparent color intensity in a macro halftone cell region, a highest ranking level being associated with a minimum apparent color intensity and a lowest ranking level being associated with a maximum apparent color intensity;

allocating to each ranking level one or more pixels of each macro halftone cell such that the pixels of the macro halftone cell are non-uniformly distributed among the plurality of ranking levels;

selecting one of the ranking levels for each macro halftone cell based upon an input value associated with the macro halftone cell; and in each macro halftone cell, darkening each pixel allocated to a ranking level greater than the ranking level selected for the macro halftone cell, wherein the pixels of each macro halftone cell are non-uniformly allocated among the ranking levels such that the apparent level of color intensity of each macro halftone cell is linearly proportional to the associated input value.

2. The method of claim 1, further comprising partitioning each macro halftone cell into a plurality of sub-halftone cells, each sub-halftone cell having a center, and wherein said step of allocating to each ranking level one or more pixels includes associating a ranking level with each individual pixel which is a decreasing function of the distance between the center of the sub-halftone cell and the pixel, wherein a pixel closest to the center of the sub-halftone cell is associated with the maximum ranking level of pixels within the sub-halftone cell and a pixel furthest from center of the sub-halftone cell minimum ranking level of pixels within the sub-halftone cell.

3. The method of claim 2, wherein said macro halftone cell has boundary edges and each said sub-halftone cell has boundary edges which are inclined with respect to the macro halftone cell boundary edges.

4. The method of claim 3, wherein each sub-halftone cell has an outline approximating a circle.

5. The method of claim 4, wherein each said sub-halftone cell has a parallelogram shape.

6. The method of claim 2, wherein each pixel has a respective position in a respective sub-halftone cell, and a pixel at one position in one sub-halftone cell has a rank different from the rank of the pixel in the corresponding position in an adjacent sub-halftone cell.

7. The method of claim 2, wherein each sub-halftone cell is composed of a number of contiguous pixels which is an even-numbered submultiple of the number of pixels in one macro halftone cell.

8. The method of claim 2, wherein all pixels which are darkened within a sub-halftone cell are contiguous.

9. The method of claim 1, wherein a plurality of pixels in one said macro halftone cell have the same rank.

10. The method of claim 1, wherein said step of allocating to each ranking level one or more pixels is performed according to a non-linear function of the level of color intensity so that a gamma correction is effected during said step of darkening.

11. A system for halftoning in an area defined by a matrix of pixels comprising:

means for partitioning the area into a plurality of macro halftone cells, each macro halftone cell being constituted by an array of contiguous pixels;

means for defining a plurality of ranking levels, each ranking level being associated with a linear function of a desired level of apparent color intensity in a macro halftone cell region, a highest ranking level being associated with a minimum apparent color intensity and a lowest ranking level being associated with a maximum apparent color intensity level;

means for allocating to each ranking level one or more pixels of each macro halftone cell such that the pixels of the macro halftone cell are non-uniformly distributed among the plurality of ranking levels;

means for selecting one of the ranking levels for each macro halftone cell based upon an input value associated with the macro halftone cell; and means for darkening, in each macro halftone cell, each pixel allocated to a ranking level which is greater than the ranking level for the macro halftone cell, wherein the pixels of each macro halftone cell are non-uniformly allocated among the ranking levels such that the apparent level of color intensity of each macro halftone cell is linearly proportional to the associated input value.

12. The system of claim 11, wherein each macro halftone cell is partitioned into a plurality of sub-halftone cells, each sub-halftone cell having a center, and wherein said means for allocating to each ranking level associates each individual pixel within each sub-halftone cell with a ranking level which is a decreasing function of the distance between the center of the sub-halftone cell and the pixel, wherein a pixel closest to the center of the sub-halftone cell is associated with the maximum ranking level of pixels within the sub-halftone cell and a pixel furthest from center of the sub-halftone cell minimum ranking level of pixels within the sub-halftone cell.

13. The system of claim 12, wherein said macro halftone cell has boundary edges and each said sub-halftone cell has boundary edges which are inclined with respect to the macro halftone cell boundary edges.

14. The system of claim 13, wherein each sub-halftone cell has an outline approximating a circle.

15. The system of claim 14, wherein each said sub-halftone cell has a parallelogram shape.

16. The system of claim 12, wherein each pixel has a respective position in a respective sub-halftone cell, and a pixel at one position in one sub-halftone cell has a rank different from the rank of the pixel in the corresponding position in an adjacent sub-halftone cell.

17. The system of claim 12, wherein each sub-halftone cell is composed of a number of contiguous pixels which is an even-numbered submultiple of the number of pixels in one macro halftone cell.

18. The system of claim 12, wherein all pixels which are darkened within a sub-halftone cell are contiguous.

19. The system of claim 11, wherein a plurality of pixels in one said macro halftone cell have the same rank.

20. The system of claim 11, wherein said means for ranking are operative for ranking pixels in each macro halftone cell according to a non-linear function of the level of color intensity so that a gamma correction is effected during said step of darkening.

* * * * *